(12) United States Patent
Ehlers

(10) Patent No.: US 11,230,989 B1
(45) Date of Patent: Jan. 25, 2022

(54) SYSTEM AND METHOD FOR DISABLEMENT OF DIESEL ENGINE FUEL INJECTORS DURING CRANKING

(71) Applicant: International Engine Intellectual Property Company, LLC, Lisle, IL (US)

(72) Inventor: Mark Stephan Ehlers, Ft. Wayne, IN (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 0 days.

(21) Appl. No.: 17/192,618

(22) Filed: Mar. 4, 2021

(51) Int. Cl.
*F02D 41/38* (2006.01)
*F02N 11/08* (2006.01)
*F02D 41/00* (2006.01)

(52) U.S. Cl.
CPC ......... *F02D 41/38* (2013.01); *F02D 41/0002* (2013.01); *F02N 11/08* (2013.01); *F02D 2041/389* (2013.01); *F02D 2200/602* (2013.01)

(58) Field of Classification Search
CPC ............. F02D 41/38; F02D 41/0002; F02D 2041/389; F02D 2200/602; F02N 11/08
See application file for complete search history.

(56) References Cited

U.S. PATENT DOCUMENTS

| 2004/0154581 A1* | 8/2004 | Yamaoka | F02D 41/3041 123/299 |
| 2010/0081539 A1* | 4/2010 | Endo | B60L 7/24 477/3 |
| 2020/0391743 A1* | 12/2020 | Takebayashi | F15B 11/20 |

\* cited by examiner

*Primary Examiner* — Joseph J Dallo
(74) *Attorney, Agent, or Firm* — Jack D. Nimz; Mark C. Bach

(57) ABSTRACT

A system and method for toolless disablement of diesel engine fuel injectors during engine cranking to facilitate diagnostics by depressing an engine throttle to a predetermined minimum depression level, say, at least 90% of an engine throttle distance to a floor of a diesel vehicle, depressing a brake, actuating a compression-ignition cycle actuator to a crank position, and holding the depressed brake, depressed engine throttle to its predetermined depression level for a predetermined minimum period, for instance at least 3 seconds, sending signals from an engine throttle position sensor and an ignition sensor to an engine control module, receiving signals from the engine throttle position sensor and ignition sensor by the engine control module, sending signals from the engine control module to the at least one fuel injector to disable the at least one fuel injector, controlling cranking of an engine with the engine control module, and allowing the engine to crank with at least one disabled fuel injector and without the engine starting.

8 Claims, 2 Drawing Sheets

SYSTEM AND METHOD FOR DISABLEMENT OF DIESEL ENGINE FUEL INJECTORS DURING CRANKING

BACKGROUND

Ignition in a diesel engine is achieved by compressing air in a combustion chamber of an engine. Diesel engines do not use a spark to ignite diesel fuel sprayed into the combustion chamber of the engine.

The compression-ignition cycle is typically started by rapidly turning over a starting motor to obtain the required heat from cylinder compression needed to ignite the diesel fuel in the combustion chambers of a diesel engine. Fuel injectors are used to inject the diesel fuel into the combustion chamber.

Certain diagnostic tests require fuel injectors to be disabled to allow the engine to be cranked without starting. Fuel injectors do not have an on/off button and they can be difficult to physically reach in a diesel vehicle. Prior to changes in emission regulations, it was rather simple for a diesel technician to prevent a diesel engine from starting while cranking the engine with the electric starter motor. The technician could easily unplug a sensor or actuator on the engine that was essential for the engine to start and then crank the engine. Unplugging a sensor or actuator would not result in a broadcasting of fault codes to a telematics monitoring center or require tools, such as a scan tool, to clear the fault codes. Also, strict emission regulations have required the addition of equipment, in the hood of a diesel vehicle, such as electronics, monitoring systems, and monitoring sensors. The additional equipment necessary to meet the newer emission regulations has left little open space in an engine area under a hood to work on the engine.

Also, the combination of sophisticated vehicle telematics, monitoring systems, and fault detection systems make it difficult to unplug a sensor or actuator. The electrical connections in a diesel engine may now have locking mechanisms to ensure they do not inadvertently disconnect, and unlocking the electrical connections can be quite difficult. The current systems in diesel engines are not suited for frequent cycling, which is required for certain diagnostic testing. Depriving the engine of fuel or air to prevent starting also can introduce other unwanted problems, such as downstream fault codes and other emission control related issues.

Accordingly, most modern diesel engine manufacturers provide a way to disable engine starting by using a diagnostic tool that communicates with the engine in such a way as to avoid triggering fault code and other emission diagnostic issues. The tool is expensive, generally laptop based, and requires advanced training for a technician to properly employ the tool. Therefore, the tool is typically only available in a dealership repair shop setting.

Manually disabling fuel injectors may require removal of an engine control module (ECM) wiring harness, which is typically locked in place. Removing the ECM wiring harness requires unlocking the electrical connections and may result in a sending of anywhere from one to a multitude of fault codes to the emission diagnostics monitoring center.

Hence, with current systems and methods having to manually disable the fuel injectors, or having to use the available diagnostic tool as described above, to disable the fuel injectors is time consuming, requires much labor, and requires a highly skilled technician to perform the disablement.

There remains a need for a method of temporarily disabling the fuel injection system of a diesel engine while the engine is cranking that saves time, labor, and creates a simple way for any diesel technician to disable the fuel injectors without the need for specialized equipment or tools.

SUMMARY OF THE DISCLOSURE

The present disclosure provides a solution to the problem of having to manually disable the fuel injection system or to use the available diagnostic tool to disable the fuel injection system of a diesel engine while cranking the engine to, in part, to perform diagnostic tests on the diesel engine.

The present disclosure provides systems and methods by which a technician may disable one or both of a diesel engine fuel injection system and/or fuel injectors during engine cranking without a diesel vehicle operator accidentally engaging the toolless system method for disabling the fuel injectors.

In at least one aspect of the present disclosure, a control system for toolless disablement of diesel engine fuel injectors is described.

In at least one aspect of the present disclosure, a method for toolless disablement of diesel engine fuel injectors can comprise determining that at least one diesel fuel injector needs to be disabled, disabling the at least one fuel injector by depressing an engine throttle to a predetermined minimum depression level, say, at least 90% of an engine throttle distance to a floor of a diesel vehicle, depressing a brake, actuating a compression-ignition cycle actuator to a crank position, and holding the depressed brake, depressed engine throttle to its predetermined depression level for a predetermined minimum period, for instance at least 3 seconds, sending signals from an engine throttle position sensor and an ignition sensor to an engine control module, receiving signals from the engine throttle position sensor and ignition sensor by the engine control module, sending signals from the engine control module to the at least one fuel injector to disable the at least one fuel injector, controlling cranking of an engine with the engine control module, and allowing the engine to crank with at least one disabled fuel injector and without the engine starting.

In at least one aspect of the present disclosure, the method can comprise determining that the at least one fuel injector can be reenabled, and reenabling the at least one fuel injector by actuating the compression-ignition actuator without depressing the break or the engine throttle.

In at least one aspect of the present disclosure, the method can comprise performing a load test on a battery pack.

In at least one aspect of the present disclosure, the method can comprise actuating a compression-ignition cycle actuator to a stop position to stop a diesel engine from running.

In at least one aspect of the present disclosure, the method can comprise changing the compression-ignition cycle actuator position from the crank position to the stop position.

In at least one aspect of the present disclosure, the method can comprise having the engine control module in electrical communication with at least the diesel engine, the at least one fuel injector and a starter motor, wherein the engine control module is programmed to disable the at least one fuel injector when engine throttle is depressed to at least 95% of an engine throttle distance to a floor of a diesel vehicle, the brake is depressed, the compression-ignition cycle actuator is engaged in the crank position, and the diesel engine has been cranked for 5 seconds.

In at least one aspect of the present disclosure, the method can comprise determining that at least one fuel injector is to be disabled further comprises analyzing various sensor values to compute a diesel fuel to air ratio.

In at least one aspect of the present disclosure, the method can comprise performing at least one diagnostic test on a diesel vehicle, wherein no locks on electrical connections need to be unlocked to perform the at least one diagnostic test.

In at least one aspect of the present disclosure, disabling the at least one fuel injector does not broadcast a fault code to a telematics monitoring center.

In at least one aspect of the present disclosure, the method can comprise not removing an engine control module wiring harness to disable the at least one fuel injector.

In at least one aspect of the present disclosure, a system for toolless disabling a diesel engine fuel injector can comprise a diesel engine, at least one fuel injector for injecting diesel fuel into at least one combustion chamber of the diesel engine, a starter motor for applying a rotational force to the diesel engine, the diesel engine combusting through compression of the diesel fuel injected into the at least one combustion chamber by the at least one fuel injector, a compression-ignition cycle actuator that controls the starting of a compression-ignition cycle and the stopping of a diesel engine, wherein the compression-ignition cycle actuator comprises a crank position and a stop position, an engine throttle in electrical communication with an engine control module, a brake in electrical communication with the engine control module, and the engine control module in electrical communication with at least the diesel engine, the at least one fuel injector, and the starter motor, wherein the engine control module is programmed to disable the at least one fuel injector when the engine throttle is depressed to at least 90% of an engine throttle distance to a floor of a diesel vehicle, the brake is depressed, the compression-ignition cycle actuator is engaged in the crank position, and the diesel engine has been cranked for 5 seconds.

In at least one aspect of the present disclosure, the engine control module will reenable the at least one fuel injector that has been disabled when the compression-ignition cycle actuator is actuated and the engine throttle is not depressed.

In at least one aspect of the present disclosure, the engine control module will reenable the at least one fuel injector that has been disabled when the engine. throttle has been depressed to at least 90% of the engine throttle distance to a floor of a diesel vehicle, the brake has been depressed, the compression-ignition cycle actuator is engaged in the crank position, and the diesel engine has been cranked for at least 10 seconds.

In at least one aspect of the present disclosure, the system can comprise an engine throttle sensor and an ignition sensor, wherein the engine throttle sensor also senses the position of the brake.

In at least one aspect of the present disclosure, the engine control module is in electronic communication with the engine throttle sensor and ignition sensor.

In at least one aspect of the present disclosure, the engine control module can send a signal to the fuel injector to reenable the fuel injector after receiving signals from the engine throttle sensor and ignition sensor.

In at least one aspect of the present disclosure, the engine control module can be programmed to adjust operating parameters of the diesel engine based on signals and data received from a water temperature sensor, a crank angle sensor, a cam angle sensor, an intake pressure sensor, an airflow sensor, an engine throttle position sensor, a vehicle speed sensor, a battery sensor, or combinations thereof.

In at least one aspect of the present disclosure, the engine control module receives and stores data sent the sensors, the data comprising at least three of temperature of engine coolant, battery power level, crank angle, engine speed, cylinder determination result, intake pressure, and intake airflow rate, amount of diesel injected into the combustion chamber, and diesel to air ratio in the combustion chamber prior to combustion.

In at least one aspect of the present disclosure, the system can comprise an engine control module wiring harness, wherein the engine control module wiring harness is not removed to disable the at least one fuel injector.

In at least one aspect of the present disclosure, the system can comprise not employing engine diagnostic software to execute a diagnostic test using an onboard diagnostic based tool to disable the at least one fuel injector.

Those skilled in the art will further appreciate the above-mentioned advantages and superior features of the disclosure together with other important aspects thereof up reading the detailed description which follows in conjunction with the drawings.

DETAILED DESCRIPTION OF THE PRESENT DISCLOSURE

Figure 1:
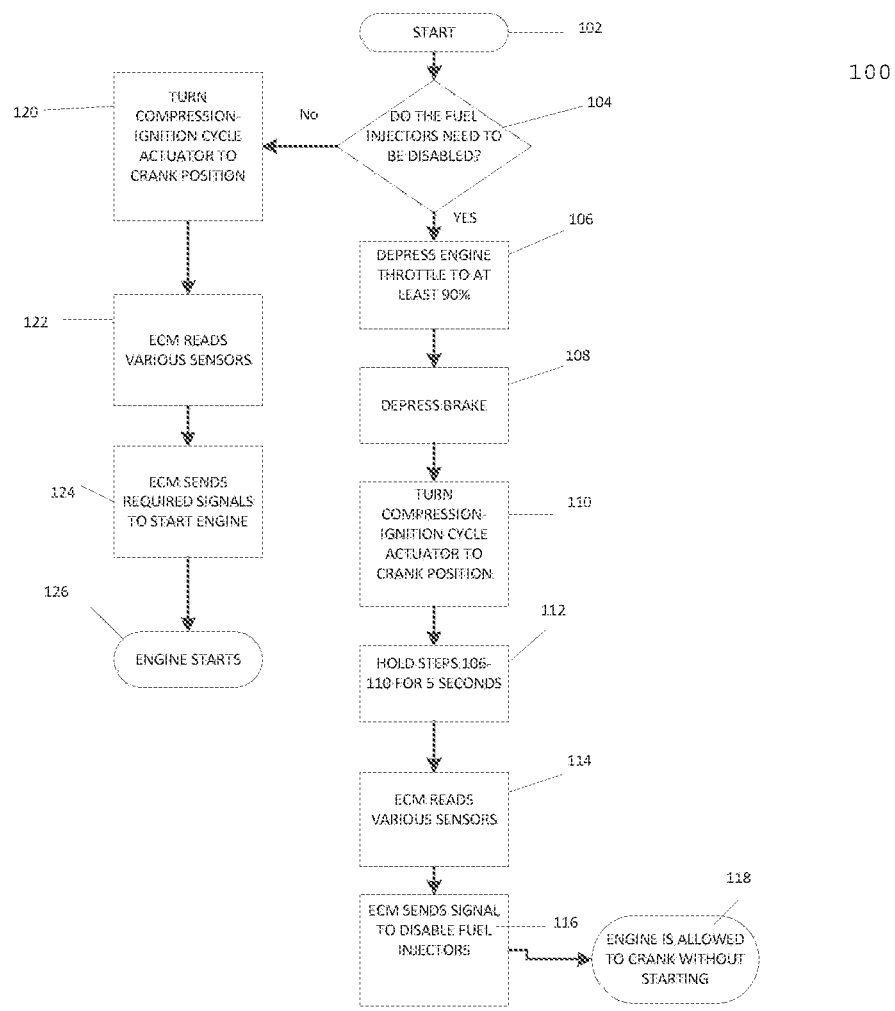
FIG. 1 illustrates at least one aspect of a process flow diagram for disabling a diesel fuel injector without a tool in accordance with the present disclosure.

The following detailed aspects or aspects presented herein are for illustrative purposes. That is, this detailed description is intended to be exemplary of the present disclosure for the purposes of providing and aiding a person skilled in the pertinent art to readily understand how to make and use of the present disclosure.

Accordingly, the detailed discussion herein of one or more aspects or aspects is not intended, nor it is to be construed, to limit the boundaries of the descriptions but rather as defined by the claims and equivalents thereof. Therefore, embodiments not specifically addressed herein, such as adaptations, variations, modifications, and equivalent arrangements, should be and are considered to be implicitly disclosed by the illustrative embodiments and claims set forth herein and therefore fall within the scope of the present disclosure.

Further, it should be understood that, although steps of various claimed methods may be shown and described as being in a sequence or temporal order, the steps of any such method are not limited to being carried out in any particular sequence or order, absent an indication otherwise. That is, the claimed method steps are considered capable of being carried out in any sequential combination or permutation order while still falling within the scope of the present disclosure.

Additionally, it is important to note that each term used herein refers to that which a person skilled in the relevant art would understand such term to mean, based on the contextual use of such term herein. To the extent that the meaning of a term used herein, as understood by the person skilled in the relevant art based on the contextual use of such term, differs in any way from any particular dictionary definition of such term, it is intended that the meaning of the term as understood by the person skilled in the relevant art should prevail.

Furthermore, a person skilled in the art of reading claimed inventions should understand that "a" and "an" each generally denotes "at least one," but does not exclude a plurality unless the contextual use dictates otherwise. Also, the term "or" denotes "at least one of the items," but does not exclude a plurality of items of the list.

In the description which follows, like parts are marked throughout the specification and drawings with the same reference numerals, respectively. The drawing figures may not necessarily be to scale and certain features may be shown in somewhat schematic form in the interest of clarity and conciseness.

Most diesel engines require diagnostic testing from time to time, and disabling the fuel injectors or fuel injection system may be required to perform the diagnostic tests. Many diagnostic tests require a technician to crank the diesel engine without allowing it to start. Diesel fuel is typically introduced into a combustion chamber of a diesel engine by a diesel fuel injection system when the diesel engine is cranked, and the fuel injectors do not comprise an on/off switch or button.

Disabling diesel engine fuel injectors is a time consuming and expensive process. Current technologies require removal of an engine control module (ECM) wiring harness to disable the diesel fuel injectors. Further, any fault codes triggered by the disconnection of the ECM have to be cleared. Current technologies also require the use of a scan tool or a special tool to allow the diesel engine to be cranked without starting. The present disclosure is directed toward a system and method for toolless disablement of a diesel fuel injector.

There are many reasons why it may be desired to be able to crank a diesel engine without starting it. Testing of various systems in a diesel vehicle can require a technician to be able to crank the engine without starting it. Some tests that may need to be performed comprise voltage drop test of starter circuit, load testing of battery pack, improved priming of some diesel engine duel systems while allowing less air to enter the fuel injector, testing the engine starting system, executing of a relative compression test (RCT) using a scope or on board diagnostic tool, building additional heat in the combustion chamber to aid in ease of the engine starting, and reposition the diesel engine through a "bumping the starter" method. This list is not exhaustive, not meant to be limiting to this disclosure, and is included herein as an exemplary list of desired tests that may be performed on a diesel vehicle or diesel engine.

Cranking a diesel engine without starting it requires disablement of the fuel injector system and fuel injectors. The present disclosure provides a discrete way of allowing a technician to disable a diesel engine fuel injection system and/or fuel injectors without a diesel vehicle operator accidentally engaging the toolless system method for disabling the fuel injectors. Cranking a diesel engine puts the highest electrical load on the battery, and the integrity of the battery, starter, starter circuit, and cables can be tested by cranking a diesel engine.

Generally, when a diesel engine is started, a diesel vehicle operator does not depress the engine throttle or the brake to start the engine. A diesel vehicle operator will engage a compression-ignition cycle by engaging a compression-ignition cycle actuator, such as a key, remote start button, or the like.

Referring to FIG. 1, there is illustrated at least one aspect of a process flow diagram illustrating an exemplary method for toolless disablement of at least one diesel fuel injector, hereinafter referred to as disablement method 100. The disablement method 100 comprises the steps of starting the method 102, determining if the diesel fuel injectors need to disabled 104, depressing the engine throttle to 90% 104, depressing the brake 108, actuating or turning the compression-ignition cycle actuator to a crank position 110, and holding steps 106 and 108 in their depressed positions while engaging the compression-ignition cycle actuator simultaneously for five seconds 112.

Diesel fuel may not be present in any combustion chambers of a diesel engine prior to performing the starting the method 102.

The ECM will read signals from various sensors 114 placed around the diesel engine to determine whether to start or crank the diesel engine without starting it. The ECM can look for lock-out signals prior to starting a diesel engine, and may not allow an engine to crank while determining if lock-out signals are present when starting a diesel engine. If the ECM receives signals from the brake showing it is depressed, from the engine throttle that it is depressed at least 90% of the distance to the floor, and the compression-ignition cycle actuator is engaged, the ECM will disable the fuel injectors 116 and allow the engine to crank without starting 118.

If it is determined that the fuel injectors do not need to be disabled, the compression-ignition cycle actuator can be engaged in a crank position 120, the ECM will read various sensors 122 and not receive signals that the brake is depressed and the engine throttle is depressed to at least 90% of the distance to the floor, and the ECM will send signals required to start the engine normally, with the at least one fuel injector enabled 124. The fuel injectors or fuel injection system will not be disabled and the engine will start 126.

When it is determined that at least one diesel fuel injector needs to be disabled 104, the steps then can be performed to disable at least one diesel fuel injector. Depressing the engine throttle to 90% of the distance the engine throttle is away from the floor of the diesel vehicle 106 can be the first step in the process of disabling at least one diesel fuel injector. The engine throttle can be depressed from 90%-100% 110 distance the engine throttle is away from the floor of the diesel vehicle and this disclosure is not intended to be limited by the 90% quantity shown in FIG. 1.

The first step can also be actuating a compression-ignition cycle actuator to an on or crank position 110. A compression-ignition cycle actuator can be a key, a button, a wireless control device, an application on a mobile device, or any other type of device that starts a compression-ignition cycle of a diesel engine. The first step can also be depressing a brake 108 in the diesel vehicle. The order of steps 106-110, or depressing the brake 108, depressing the engine throttle 106, or actuating a compression-ignition cycle actuator 110 to start the disablement of the diesel fuel injector, does not matter.

When the brake has been depressed 108, the engine throttle has been depressed to a desired distance that the engine throttle is away, from 90% to 100% of the distance the engine throttle sits above the floor, or any percent distance in that range, and the compression-ignition actuator has to be actuated 110 together or simultaneously, and held for 3-6 seconds 112, or any amount of time desired, the at least one diesel fuel injector will be disabled. The steps may be held for 3, 4, 5, 6 seconds 112, or for any time span that is desired.

The time span of performing and holding steps 106-110 is to reduce the probability of a diesel vehicle operator from accidentally disabling the fuel injection system when starting a diesel vehicle. Typically, a diesel vehicle operator does not depress an engine throttle or a brake when starting the diesel vehicle. Further, a diesel vehicle operator will not depress an engine throttle and a brake simultaneously when starting a diesel vehicle. A diesel vehicle operator will engage a compression-ignition cycle actuator when starting a diesel vehicle.

There are at least two methods of reenabling the disabled diesel fuel injector or fuel injection system. One method of reenabling can comprise starting the engine normally after the diesel fuel injector has been disabled. The ECM will not receive or read signals from the various sensors 122 that instruct the ECM to disable the fuel injectors. The ECM will proceed to start the engine normally with the at least one fuel injectors enabled 124. A second method of reenabling the fuel injectors or fuel injection system can be by depressing the brake 108, depressing the engine throttle to a desired distance that the engine throttle is away, from 90% to 100% of the distance of the resting position of the engine throttle to the floor, or any desired distance, and actuating the compression-ignition cycle actuator 110 together, and holding each simultaneously for 8-15 seconds, or any amount of time in that range, as desired. Holding the performance of steps 106 and 108, performed together, for at least 8, 9, 10, 11, 12, 13, 14, or 15 seconds will reenable the at least one diesel fuel injector and the ECM will send all required signals and instructions to the various parts of an engine for the engine to start.

Typically, the operations of a diesel vehicle are remotely monitored by a telematics monitoring center. The telematics monitoring center receives signals and/or transmissions from a mobile telecommunication device that is connected to the diesel vehicle. The mobile telecommunication device receives, stores, and sends data collected by the ECM to the telematics monitoring center. Most mobile telecommunication devices are capable of reporting vehicle operation data in real-time to the telematics monitoring center. Some of the information a mobile telecommunication device can report to a telematics monitoring center are current vehicle location, vehicle location history, onboard network sensor data, log historic truck onboard network sensor data, a snapshot truck onboard network sensor data, current operating conditions, data collected by the ECM from all sensors, and more.

Data sent from a mobile telecommunication device to a telematics monitoring center can be transmitted wirelessly through cellular data networks, low-orbit satellites, and/or Wi-Fi to relay data to a telematics monitoring center's computer system that comprises a display for viewing the data, typically through a web portal.

When the data sent by a mobile telecommunication device to a telematics monitoring center does not fall within a predetermined range of acceptable data for a certain operating condition, a fault code is generated in the diesel vehicle and an alert is generated at the telematics monitoring center. Clearing fault codes requires a special scan tool. Performing the disablement method 100 described herein will not generate a fault code or generate an alert at the telematics monitoring center.

Figure 2:
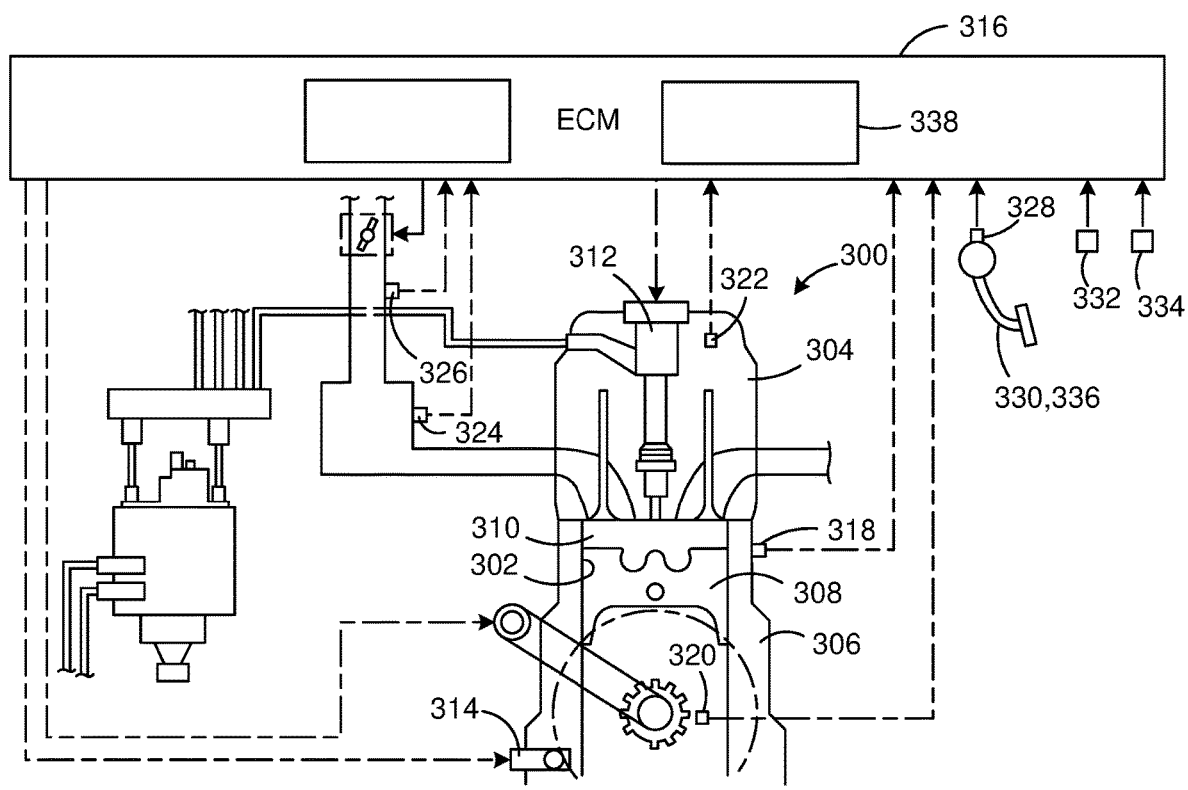
FIG. 2 illustrates at least one aspect of a process flow diagram for disabling a diesel fuel injector without a tool in accordance with the present disclosure.

Turning to FIG. 2, at least one aspect of a system for toolless disablement of a diesel fuel injection diesel is shown. A diesel engine can comprise a body 300, at least four compression cylinders 302, a cylinder head 304 disposed on the top of the cylinder block 306, and at least four pistons 308 slidably housed by the at least four compression cylinders 302, respectively.

A combustion chamber 310 located above each of the at least four pistons 308, and diesel fuel is injected into each combustion chamber 310 by a diesel fuel injector 312. Compression of the at least one of the at least four pistons 308 in the compression cylinder 302 ignites the diesel fuel injected into the combustion chamber 310 by compression operation.

A starter motor 314 is affixed to the cylinder block 306 for starting the diesel engine. A diesel engine may comprise more components than described here, and one having ordinary skill in the art would understand what components are typically parts of a diesel engine.

Each component of the engine configured as above is controlled overall by an engine control module (ECM) 316. The ECM 416 can be a microprocessor comprising, for example, a CPC, a ROM, and a RAM that are well known.

The ECM 316 can be designed to store is various information from various sensors placed around the diesel engine and diesel engine components. The ECM 316 may be in electronic communication with a water temperature sensor 318, the crank angle sensor 320, a cam angle sensor 322, an intake pressure sensor 324, and an airflow sensor 326. The ECM 316 can collect, store, and transmit various sensor data collected from the sensors, e.g., temperature of the engine coolant, crank angle, engine speed, cylinder determination result, intake pressure, and intake airflow rate, amount of diesel injected into the combustion chamber, diesel to air ratio in the combustion chamber 130 prior to combustion, based on the input signals sent to the ECM 316 from the various sensors.

The ECM 316 can also receive, collect, store, and transmit information transmitted from an engine throttle position sensor 328 for detecting a position of an engine throttle 330, vehicle speed sensor 332 for detecting a vehicle speed of a traveling diesel vehicle, and a battery sensor 334 for detecting the battery or battery pack performance (not illustrated). The engine throttle position sensor 328 may also collect data from a brake 336 and detect whether a brake 336 is depressed or engaged, or if the brake 336 is not engaged. The ECM 316 can collect, store, and transmit information received from various sensors comprising the engine throttle 330 position, the application of the brake 336, the vehicle speed, and the remaining level of the battery or battery pack.

The ECM 316 can control the components of a diesel engine and can comprise a means for performing various calculations based on data collected from the various. The ECM can be in electronic communication with the diesel fuel injector 12, the starter motor 314, or any other component in a diesel engine that can be in electronic communication with the ECM 316. The ECM 316 can change the operating conditions of the diesel engine if the calculated data is outside of pre-determined or preferred ranges of the information and send signals to the diesel engine components to adjust the component operating parameters.

The ECM 316 can send signals to control the amount of diesel fuel injected into the combustion chamber 310, based on pre-determined or preferred operating conditions stored in the ECM 316. The ECM 316 can comprise instructions to disable a diesel fuel injector 312. The instructions can comprise the steps 106 and 108 in FIG. 1.

Once the ECM 316 receives signals from the engine throttle position sensor 328 showing the position of the engine throttle 330 and brake 336, and receives signals from an ignition sensor 338, and the signals match the criteria set out in steps 106-110 of FIG. 1 stored in the ECM 16 for disabling the diesel fuel injector 312, the ECM 316 will disable the diesel fuel injector 312.

If it is determined that the diesel fuel injector 312 should be reenabled, the ECM can reenable it. Once the ECM 316 receives signals from the engine throttle position sensor 328 showing the position of the engine throttle 330 and brake 336, and receives signals from an ignition sensor 338, and the signals match the criteria set out in step 124 of FIG. 1 stored in the ECM 316 for reenabling the diesel fuel injector 312, the ECM 316 will reenable the diesel fuel injector 312.

The illustrations in FIGS. 1-2 are meant to serve a general description of the concept of a system and method for toolless disablement of a diesel fuel injector. Alternate mechanisms and combinations thereof are possible and may be obvious to someone knowledgeable in the art based on this disclosure.

Although the disclosure references disabling of fuel injectors, the invention is also applicable to disabling the supply of air to the engine cylinders and/or disabling the supply of fuel to the engine cylinders. Also, for clarity, it is not necessary that the accelerator pedal, brake pedal and actuator move simultaneously in any way, only that they are all in their depressed/second positions at the same time at some point and remain in their depressed/second positions for the predetermined period of time. Also, it does not matter the order in which any of the accelerator pedal, brake pedal and actuator are moved to their respective depressed/second positions. Further, it is appreciated that the predetermined period of time for depressing the accelerator pedal, the brake pedal and the actuator may be different, respective periods of time—or alternatively they may all have the same predetermined period of time.

Although preferred aspects of the disclosure have been described in detail herein, those skilled in the art will recognize that various substitutions and modifications may be made without departing from the scope and spirit of the appended claims.

What is claimed is:

1. A system for cranking a diesel engine of a vehicle without it starting, the diesel engine having one or more fuel injectors, the vehicle having:
an accelerator pedal that moves between a raised accelerator position when not actuated and a fully depressed actuator position when fully actuated;
an acceleration pedal position sensor which sends a signal indicative of the position of the accelerator pedal;
a brake pedal which moves between a raised brake pedal position when not actuated and a fully depressed brake pedal position when fully actuated;
a brake pedal position sensor which sends a signal indicative of the position of the brake pedal;
an actuator for turning over the engine which moves between a first actuator position when not actuated in which first position does not cause turning over of the engine, and a second actuator position when fully actuated which second position causes turning over of the engine;
an actuator sensor which sends a signal indicative of when the actuator is in its fully actuated position;
one or more fuel injectors for injecting fuel into the cylinders of the diesel engine; and
a fuel injector controller for controlling actuation of the one or more fuel injectors;
the system comprising: an electronic control module programmed to receive the electrical signals from the accelerator pedal position sensor, the brake pedal position sensor and the actuator sensor, and sending a signal to the fuel injection controller to disable all of the fuel injectors, while allowing the engine to turn over, upon the occurrence of the electronic control module receiving signals indicating that:
a) the accelerator pedal has been depressed to a predetermined accelerator pedal position between its raised position and fully depressed position or depressed greater; and
b) the brake pedal has been depressed to a predetermined brake pedal position between its raised position and fully depressed position or depressed greater; and
c) the actuator is retained in its second actuator position;
all three simultaneously for a predetermined period of time.

2. The system of claim 1, further comprising:
allowing the engine to continue turning over while the fuel injectors remain disabled for as long as:
the accelerator pedal remains depressed to its predetermined position or greater; and
the brake pedal remains depressed to its predetermined position or greater; and
the actuator is retained in its second position.

3. The system of claim 1 in which the control module is programmed to stop further turning over of the engine upon the occurrence of one or more of:
the accelerator pedal moving to a position less depressed than the predetermined accelerator pedal position;
the brake pedal moving to a position less depressed than the predetermined brake pedal position; and
the actuator moving from its second actuator position.

4. The system of claim 1 in which the predetermined accelerator position is 90% or greater of the fully depressed position.

5. The system of claim 1 in which the predetermined brake pedal position is 10% or greater of the fully depressed brake pedal position.

6. The system of claim 1 in which the actuator is a key ignition and full turning of the key moves the actuator to its second actuator position.

7. A system for toolless disablement of a diesel engine fuel injector comprising:
a diesel engine;
at least one fuel injector for injecting diesel fuel into at least one combustion chamber of the diesel engine;
a starter motor for applying a rotational force to the diesel engine, the diesel engine combusting through compression of the diesel fuel injected into the at least one combustion chamber by the at least one fuel injector;
a compression-ignition cycle actuator that controls the starting of a compression-ignition cycle and the stopping of a diesel engine, wherein the compression-ignition cycle actuator comprises a crank position and a stop position;
an engine throttle in electrical communication with an engine control module;
a brake in electrical communication with the engine control module; and
the engine control module in electrical communication with at least the diesel engine, the at least one fuel injector, and a starter motor, wherein the engine control module is programmed to disable the at least one fuel injector when the engine throttle is depressed to at least 90% of an engine throttle distance to a floor of a diesel vehicle, the brake is depressed, the compression-ignition cycle actuator is engaged in the crank position, and the diesel engine has been cranked for 5 seconds.

8. A method for cranking a diesel engine of a vehicle without it starting, the diesel engine having one or more fuel injectors, the vehicle having:

an accelerator pedal that moves between a raised accelerator position when not actuated and a fully depressed actuator position when fully actuated;

a brake pedal which moves between a raised brake pedal position when not actuated and a fully depressed brake pedal position when fully actuated;

an actuator for turning over the engine which moves between a first actuator position when not actuated in which first position does not cause turning over of the engine, and a second actuator position when fully actuated which second position causes turning over of the engine; and one or more fuel injectors for injecting fuel into the cylinders of the diesel engine; and the method, comprising:

providing an acceleration pedal position sensor which sends a signal indicative of the position of the accelerator pedal;

providing a brake pedal position sensor which sends a signal indicative of the position of the brake pedal;

providing an actuator sensor which sends a signal indicative of when the actuator is in its fully actuated position;

providing a fuel injector controller for controlling actuation of the one or more fuel injectors;

providing an electronic control module programmed to receive the electrical signals from the accelerator pedal position sensor, the brake pedal position sensor and the actuator sensor, and sending a signal to the fuel injection controller to disable all of the fuel injectors, while allowing the engine to turn over, upon the occurrence of the electronic control module receiving signals indicating that:

d) the accelerator pedal has been depressed to a predetermined accelerator pedal position between its raised position and fully depressed position or depressed greater; and e) the brake pedal has been depressed to a predetermined brake pedal position between its raised position and fully depressed position or depressed greater; and f) the actuator is retained in its second actuator position;

all three simultaneously for a predetermined period of time.

* * * * *